US012386980B1

(12) United States Patent
Holub et al.

(10) Patent No.: US 12,386,980 B1
(45) Date of Patent: Aug. 12, 2025

(54) SOFTWARE TESTING SYSTEM FOR DETECTING CODE INJECTION VULNERABILITIES

(71) Applicant: Rapid7, Inc., Boston, MA (US)

(72) Inventors: Viliam Holub, Prague (CZ); Gerald Curran, Dublin (IE); Trevor Parsons, Donegal (IE)

(73) Assignee: Rapid7, Inc., Boston, MA (US)

( * ) Notice: Subject to any disclaimer, the term of this patent is extended or adjusted under 35 U.S.C. 154(b) by 184 days.

(21) Appl. No.: 18/203,129

(22) Filed: May 30, 2023

(51) Int. Cl.
*G06F 21/00* (2013.01)
*G06F 11/3604* (2025.01)
*G06F 21/57* (2013.01)

(52) U.S. Cl.
CPC ........ *G06F 21/577* (2013.01); *G06F 11/3612* (2013.01); *G06F 2221/033* (2013.01)

(58) Field of Classification Search
CPC .............. G06F 21/577; G06F 11/3612; G06F 2221/033
See application file for complete search history.

(56) References Cited

U.S. PATENT DOCUMENTS

| | | | | |
|---|---|---|---|---|
| 8,225,402 | B1 * | 7/2012 | Averbuch | H04L 63/14 726/22 |
| 9,348,742 | B1 * | 5/2016 | Brezinski | G06F 21/566 |
| 10,129,285 | B2 | 11/2018 | Johns et al. | |
| 10,474,815 | B2 | 11/2019 | Turgeman | |
| 10,698,684 | B2 | 6/2020 | Beckett | |
| 10,733,189 | B2 * | 8/2020 | Brookler | G06F 21/6227 |
| 11,507,673 | B1 * | 11/2022 | Ouzan | G06F 21/552 |
| 2010/0146615 | A1 * | 6/2010 | Locasto | H04L 63/1416 726/11 |
| 2012/0317647 | A1 * | 12/2012 | Brumley | G06F 21/577 726/25 |
| 2016/0094574 | A1 * | 3/2016 | Hsueh | H04L 63/1433 726/23 |
| 2017/0242987 | A1 * | 8/2017 | Williams | G06F 21/128 |
| 2019/0327265 | A1 | 10/2019 | Zhao et al. | |

(Continued)

OTHER PUBLICATIONS

Riley et al., "An Architectural Approach to Preventing Code Injection Attacks", IEEE Transactions on Dependable and Secure Computing, vol. 7, No. 4, Oct.-Dec. 2010.*

(Continued)

*Primary Examiner* — Morshed Mehedi
(74) *Attorney, Agent, or Firm* — Ashwin Anand

(57) ABSTRACT

Systems and methods are disclosed for detecting code injection vulnerabilities in software systems. In embodiments, an injection string is created to implement an exploit against a software system. The exploit includes an unauthorized executable code that will generate an easily detectable token if executed by the software system. The string is injected into the software system during execution to simulate a code injection attack on the software system. The software system's execution result is obtained and analyzed to determine whether the execution detection token was generated. If so, the software system is proven to be vulnerable to the attack, and the vulnerability may be indicated in an alert or a report. The vulnerability detection technique may be for both software under development as well as production software systems running in the wild to analyze and monitor these systems for code injection vulnerabilities.

20 Claims, 8 Drawing Sheets

(56) References Cited

U.S. PATENT DOCUMENTS

| | | |
|---|---|---|
| 2020/0097662 A1* | 3/2020 | Hufsmith .............. H04L 9/0643 |
| 2020/0177612 A1* | 6/2020 | Kras ...................... G06N 20/00 |
| 2020/0404007 A1 | 12/2020 | Singh et al. |
| 2021/0377307 A1* | 12/2021 | Santana De Oliveira ................... G06F 18/217 |
| 2024/0022600 A1* | 1/2024 | Zhang ................. H04L 63/1466 |
| 2024/0045956 A1* | 2/2024 | Fire ....................... G06F 21/563 |
| 2024/0054227 A1* | 2/2024 | Dahmen .............. G06F 21/566 |

OTHER PUBLICATIONS

2010.*
Liu et al., "A Collaborative Intrusion Detection Mechanism Against False Data Injection Attack in Advanced Metering Infrastructure", IEEE Transactions on Smart Grid, vol. 6, Issue: 5, Sep. 2015.*

* cited by examiner

*injection string 210*

*prefix 216*  *suffix 218*

```
Article Big${upper:b}ear
```

*non-executable data 212a*  *executable code 214*  *212b*

*injection string 220*

```
<?php echo md5("id-234"); ?>
```

*idempotent function invocation 222*

*injection string 230*

```
<script>
   document.write("56-!");
</script>
```

*escaped character 232*

FIG. 2

SOFTWARE TESTING SYSTEM FOR DETECTING CODE INJECTION VULNERABILITIES

BACKGROUND

Modern corporate software systems are continuously evolving. In such systems, software components such as software libraries can be updated, upgraded, replaced, added, and/or removed on a regular basis. The systems are run by operators of various sophistication, sometimes in cloud infrastructure provider networks with unknown adherence to security policies. Inevitably, vulnerabilities such as code injection vulnerabilities can be introduced and even re-introduced into these systems without detection.

Existing run-time security testing methods such as dynamic application testing apply an outside-in approach to finding vulnerabilities. One problem with such approaches is that they do not penetrate deeply into the software system. The external interfaces of the system provide only limited access into the system internals and existing vulnerabilities may not be reached or exposed in responses. As a result, code injection vulnerabilities introduced by new software components can go undetected despite software testing, creating security risks for the software operator.

SUMMARY OF EMBODIMENTS

The systems and methods described herein may be employed in various combinations and in embodiments to perform code injection vulnerability detection for software systems. In some embodiments, the vulnerability detection system generates an injection string that contains an exploit. The exploit executes an unauthorized code to generate an execution detection token or EDT. The string is injected into the software system during execution to simulate a code injection attack on the software system. Subsequently, the software system's execution results are obtained by the vulnerability detection system and analyzed to determine whether the execution detection token was generated. If the token was generated, the software system is proven to be vulnerable to the exploit, and an alert or vulnerability report may be generated. Depending on the embodiment, the code injection vulnerability detection technique may be used to analyze software during development testing or production software systems running in the wild to analyze and monitor these systems for code injection vulnerabilities.

BRIEF DESCRIPTION OF THE DRAWINGS

FIG. 2 illustrates examples of different injection strings that may be generated by the code injection vulnerability detection system, according to some embodiments.

Figure 1:
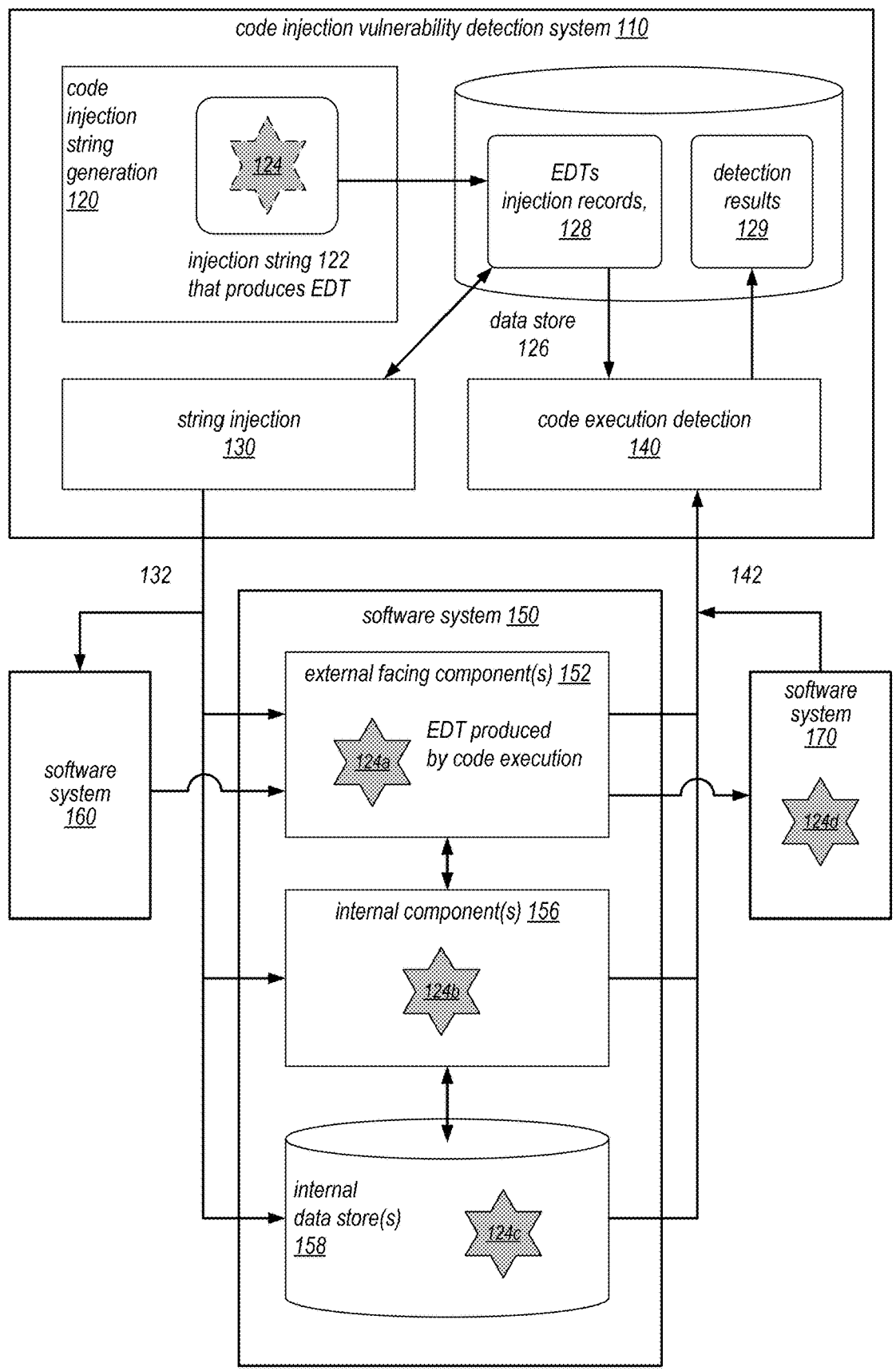
FIG. 1 is a block diagram illustrating a code injection vulnerability detection system capable of identifying code injection vulnerabilities in a software system by injecting a string into the software system that is executable to produce an execution detection token (EDT), according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various techniques are described herein to implement a code injection vulnerability detection system for software systems. The disclosed vulnerability detection system overcomes limitations of prior software testing systems to enable in-depth analysis of internal behaviors of the software system (e.g., internal API calls or data creation). Embodiments the vulnerability detection system inserts a specially generated string containing an embedded exploit that, if successfully executed, exposes a type of code injection vulnerability in the software. The exploit may be injected deeply into the software system to enable observation of internal execution behavior of the software, such as internal API calls, internal database changes, execution memory states, and the like.

When the exploit code is executed, the code generates an identifier (e.g. a witness mark or execution detection token) that proves the embedded code was in fact executed by the internals of the software. In some embodiments, the code may be prepended with a header (e.g. an HTML tag) that triggers code execution in vulnerable systems. In some embodiments, the code may specify a text transformation that causes a portion of the injection string to be transformed. For instance, a publishing system may be tested with the injection string "Article big$ {upper:b}ear". The string "$ {upper:b}" exposes a known vulnerability of a popular Java logging library (log4j), which will cause the string to be logged as:

2023-04-15 11:12:38 Submitted article "Article bigBear"

In contrast, a logging library that does not have the Log4Shell vulnerability will not transform the string and log the string as:

2023-04-15 11:12:38 Submitted article "Article ${upper:b}igBear"

After the injection, the software system is monitored for presence of the execution detection token (here "bigBear"). If the EDT "bigBear" is detected, vulnerability to the exploit is confirmed, and an alert or report may be generated. The vulnerability detection system may monitor multiple facets of the software system, including the system's execution logs, internal databases, APIs responses, or even runtime memory. The monitoring may be performed automatically and continuously, for example, as part of an ongoing network scanning or automated software testing process. In some embodiments, the EDT may be specially formatted and/or sufficiently unique so that the vulnerability can be detected without risk of false positives. In some embodiments, to maximize the likelihood of finding a vulnerability, the detection system will inject strings repeatedly, which can be generated randomly based on a set of configuration rules.

In contrast with the ephemeral and superficial testing performed by current dynamic scanners, embodiments of the disclosed vulnerability detection system allow detection tests to be performed deeply throughout the software system to surface vulnerabilities as part of the system's internally generated data. In some embodiments, poisonous data (e.g. injection strings containing the exploit) can be persisted in the software system for an extended period of time. In this manner, the software system can be tested continuously based on a single injection, even as internal components of the system change over time. In some embodiments, an exploit can be injected through a third-party system (in local as well as external environments) to further enhance the penetrative power of the detection.

The described approach significantly extends the reach and coverage of vulnerability detection methods implemented by current systems. The generation of the injection strings can be controlled via configuration interfaces to reduce the amount of noise and false positives generated by the detection system. In some embodiments, the EDT may be a unique value that can be tied back to a particular test run or test case, so that vulnerability detection reports can be generated with relevant test metadata. In some embodiments, the entire injection and detection process may be programmatically automated and orchestrated to reduce the amount of human effort and computing resources needed for the process. The described approach is highly flexible and can be employed in a variety of detection contexts, including development testing, network monitoring, penetration testing, threat hunting, third party vulnerability scanning, among others.

The disclosed vulnerability detection system improves the functioning of current computer systems that implement vulnerability detection to overcome technical challenges faced by these systems. In one respect, the disclosed system reduces the amount of human effort and compute resources needed to monitor software systems for code injection vulnerabilities and allows users to easily control and manage the detection process. In another respect, the disclosed vulnerability detection system can penetrate more deeply into software systems to observe internal execution behaviors, in contrast with current vulnerability scanners that only superficially analyze responses produced by public interfaces of services. In another respect, the disclosed vulnerability detection system is able to identify novel types of exploits that are not publicly known or recorded in public vulnerability libraries. In yet another respect, the disclosed vulnerability detection system is easy to use and can be automated or reused for many different types of software systems, in contrast with penetration test tools that are largely human-driven and require expert technical knowledge.

As will be appreciated by those skilled in the art, the disclosed features represent practical applications that provide real-world benefits in real-world compute systems and processes, and are not intended to capture bare mental processes, pure mathematical concepts or formula, methods of organizing human activity, fundamental economic practices, or other types of abstract subject matter not eligible for patenting. These and other features and benefits of the vulnerability detection system are described in further detail below in connection with the figures.

FIG. 1 is a block diagram illustrating a code injection vulnerability detection system that is capable of identifying code injection vulnerabilities in a software system by injecting a string into the software system that is executable to produce an execution detection token (EDT), according to some embodiments.

As shown, FIG. 1 depicts a code injection vulnerability detection system 110 that analyzes a software system 150 for code injection vulnerabilities. The software system 150 may be software under development or production software running in a production environment (e.g. a live web service accessible via the Internet). Depending on the embodiment, the vulnerability detection system 110 may be implemented as a part of a software testing system that tests software during development, a software monitoring or scanning service that scans production services, or a tool included in a tool suite for penetration testing or threat hunting.

As shown, the code injection vulnerability detection system 110 implements a code injection string generation component 120. Generator 120 is tasked with generating injection strings 122 to implement an exploit. The injection string 122 will be generated to include executable code that when executed produces an execution detection token (EDT) 124. Detection of the EDT 124 from the execution results of the software system 150 indicates that the software system is vulnerable to the exploit. In some embodiments, the generation behavior of the generator 120 is configurable via a configuration interface. The generator 120 may be used to generate injection strings repeatedly and randomly according to the configuration information.

In some embodiments, the generated injection strings and their associated EDTs 126 may be stored in a data store 126 of the detection system 110, so that they can be used by the string injection component 130 during the injection phase. The EDTs may be stored along with the injection records so that they can be matched to the execution results of the software system during the detection phase. The EDTs may be individually unique, and in some embodiments, uniquely identify the particular injection attempt, injection campaign, test run, or test case of the detection system. When the string injector 130 injects a stored injection string, it may at that time generate an injection record in the data store 126. The injection record may include metadata about the injection, such as the time of injection, the manner of injection, the type of exploit implemented by the injection, and any tester comments. This metadata information can be linked back to detection results if a vulnerability is later detected.

The string injector 130 is responsible for injecting 132 the strings into the software system 150. Depending on the embodiment, the injector 132 may be accomplished in a variety of ways. For offline systems (e.g. software that is under development), the string injection may have more latitude to inject strings that can cause harmful impacts on the software system 150. Offline systems are typically run in a testing environment to process synthetic data (e.g. in staging environment) or on production data with no external influence (e.g. canary systems). However, they are typically isolated from external clients so that any harmful impacts of the execution cannot affect clients. This isolation enables software testers to inject exploits into the systems without real business side-effects, leading to a very thorough vulnerability assessment of internal systems. It is especially useful as a part of a development cycle, alongside integration and acceptance tests.

Online systems typically run in production environments on production data. With online systems, testers cannot generally perform testing in a way that crashes the system or harms the system's clients. Moreover, testers may be limited in terms of the number and types of interfaces that are available for injection. However, in some cases, injection can be accomplished through a different software system 160, as shown. As one example, if the software system 150 relies on data from a third-party directory service, attack strings may be injected into the system 150 by adding directory entries to the directory service that contain the strings. In some cases, this technique may also be used to detect or assess the vulnerabilities of the other software system 160.

In some embodiments, the injection 132 may be performed as part of an automated testing process, such as ongoing regression testing, unit testing, integration testing, etc. In some embodiments, the injection 132 may be performed by a vulnerability scanner or penetration test platform, on a production service. As shown, injection strings may be submitted through a variety of injection avenues, such as the interfaces of external-facing components 152 (e.g. the public request interface of a web service), internal interfaces of internal components 156 (e.g. a library API), and internal data stores 158 (e.g. an internal database or configuration file). In some embodiments, the injection 132 may be performed via another software system 160 that provides data to the software system 150.

In some embodiments, opportunistic string injection may be used to extend data in a database randomly or semi-randomly. For example, the string may be injected as a user comment of an existing user of the system. In some embodiments, the string injection may add a field in one or more API calls or database statements. Synthetic string injection into an internal database may require some knowledge of the database object model. The injection 132 may cause artificial data objects to be created in the database (e.g. artificial users or products) with executable code embedded in certain fields (e.g. a user's or product's name). The processing of these fields may cause the exploit to be executed by the software system. Injecting strings into a database to create artificial data is a technique that can be used for online systems, since the artificial data can be made separate and distinguishable from real business data and is not typically processed together with real business data. Moreover, because the injected string can be persisted in the database indefinitely, the string can be left in place for future vulnerability detections as the software system changes.

As shown, once an injection string 122 is injected, it may cause unintended code executions within various parts of the software system 150 to create instances of the EDT 124*a-d*. As shown, the EDT 124*d* may also be generated in a downstream software system 170 that receives data from the injected software system 150. Thus, in some cases, an injection 132 may reveal vulnerabilities in a web of related software systems that propagate data among one another.

As shown, the generated EDTs 124*a-d* may be embedded in execution results 142, which are provided back to the code injection vulnerability detection system 110. These execution results 142 are analyzed by the code execution detection component 140 to look for the presence of EDTs 124. If instances of the EDT are found in the execution results, the code injection vulnerability detection system 110 has determined that the software 150 is vulnerable to the exploit.

As with the string injection 132, the execution results 142 may be obtained from a variety of different facets of the software system 150. In some embodiments, the code execution detector 140 may scan or monitor an internal database (e.g. data store 158) for instances of EDTs 124. If the detector 140 has access to the database, it may perform online scans of the data using a query language such as SQL, or alternatively examine database backups or dumps.

In some embodiments, logs of the software system 150 may be accessible. One common type of logs are web logs produced by web servers. These logs can contain intermediate information produced by execution of the software, which may include instances of EDTs. As a specific example, the Log4Shell vulnerability (CVE-2021-44228) is a type of vulnerability that can be observed in logs generated by certain versions of the Log4j Java logging framework.

In some embodiments, the code execution detector 140 may be able to obtain the contents of volatile memory of the software system 150 during execution, which can indicate instantiations of EDTs in memory. The memory state of the software 150 may be collected by the execution environment (e.g. a virtual machine manager or container manager that can snapshot or scan the memory of guest virtual machines or containers), an agent process running alongside the software process, or via code instrumentation within the software system. In some embodiments, the memory state of the software system may be dumped to a persistent data store at certain checkpoints, and these dumps can be provided to the code execution detector 140.

In some embodiments, API requests or responses associated with internal API calls may contain EDTs 124. The API may be the primary interface between in-house and third-party components within the software system, or between in-house components in microservice-based systems. In some embodiments, a first API request may inject the attack string, and a second API call may be used to extract the EDT. For example, the first API call may be an HTTP PUT request that injects the string, and the second API call may be an HTTP GET request that retrieves the string. Use of third-party APIs for vulnerability detection may be limited based on their potential business side effects on the third-party service. For example, an email provider service may require external testers to use valid email addresses, while allowing exploits to be included in the body of the email, in order to avoid undesired disruptions to the service. Example types of API data that can be monitored for the EDT detection include HTML pages returned by web servers, JSON/HTML documents required by web services, query results of database services, and responses from software-as-a-service (SaaS) APIs.

In some embodiments, the code execution detector 140 may be run independently from the string injector 130 to continuously watch for the presence of EDTs produced by the software system 150 and match them to the injection records. The code execution detector 140 may be configured to watch for EDTs in the execution results of many different software systems 150, produced by injection strings injected by many different injectors 130. In some embodiments, the code execution detection component may determine from the execution results 142 that the software system is not vulnerable to a type of exploit. For example, the detector 140 may make such a determination if the EDT is not observed after a specified period of time, or if a specific "non-execution" detection token is observed that proves the exploit was not successfully executed within the software system.

In some embodiments, if a vulnerability is detected by the code execution detector 140, the system 110 will issue an alert (e.g. a user alert to an administrator) or generate a report (e.g. a system vulnerability report) indicating the vulnerability. In some embodiments, the system 110 may automatically perform certain remediation actions in response to a detected vulnerability. Such actions may include initiating more intensive testing to probe for details about the vulnerability, or isolating or quarantining the software system from sensitive data or other systems.

FIG. 2 illustrates examples of different injection strings that may be generated by the code injection vulnerability detection system, according to some embodiments.

As shown, the figure depicts three example injection strings 210, 220, and 230. Injection string 210 illustrates a string that includes executable code 214 to transform a portion of the string 210. In this example, the executable code is demarcated in the surrounding non-executable data 212 by a prefix 216 and a suffix 218, which will cause vulnerable systems to invoke an "upper" function to convert the letter "b" to uppercase "B". Note that while in this example the executable code 214 is embedded in non-executable data 212a and 212b, in other cases, the surrounding data 212 can be another type of code that can be interpreted or executed, such as SQL, HTML, or a URL.

The prefix may be a combination of characters that breaks the flow of the surrounding data or code and enables the code 214 to be executed. For example, the prefix may include delimiters specially crafted for programming languages used in the system. Common examples of characters that break code flow in coding languages include quotes, double quotes, commas, and special tag sequences such as "<?php". In some cases, the prefix may be empty.

The suffix may be a combination of characters that terminates the code 214 within the string and enables code to be executable. For example, the "?>" suffix terminates a segment of PHP code in an HTML document. In some cases, the suffix may be empty.

The code is a sequence of characters that may be executed if the data is incorrectly handled in the system or if it is manipulated by vulnerable software. Preferably, code is crafted in a way that does not disturb the vulnerable system. In some embodiments, the code 214 may invoke one or more function calls to perform a transformation whose result is unique and easily detectable.

In injection string 210, the code 214 will transform the string to "BigBear" in vulnerable systems where the code can be executed. The term "BigBear" is the EDT and indicates a successful execution of the exploit. Systems that do not perform this unauthorized execution will not produce the EDT. Injection string 210 can be used to detect the Log4Shell vulnerability, where the logging library will interpret the {$upper:} syntax.

The precise formatting of the injection string will depend on the type of software system and the exploit being simulated. The executable code 214 may be specified in a programming language specific to the type of exploit. Common languages that may be used for the code 214 include Java, JavaScript, Hypertext Preprocessor (PHP), and Structured Query Language (SQL). In some embodiments, the selection of programming language(s) used for the code is configurable by the user as a configuration parameter.

Injection string 220 provides another example of an injected string. In this example, a PHP code statement 222 is enclosed in HTML preprocessor tags so that it can be embedded in an HTML document and executed by a vulnerable system. The code 222 causes an PHP interpreter to compute the MD5 hash of a string, which is preferably unique and may be randomly generated. The output of the code 222 is included in the HTML output so that it can be easily observed.

The code 222 may use a variety of functions to generate the EDT. For example, the query string "select md5 ('id-xyz')" may be used to simulate a SQL injection attack with similar results as the PHP example. A JavaScript code segment may invoke the JavaScript library function Math.log(12345) to compute the natural logarithm of float number, which is preferably unique and can be randomly generated. In a JavaScript environment, the results of a computation can be printed via the console.log( ) function or added to the parent document with document.createTextNode( ) and document.body.appendChild( ). In some embodiments, the choice of functions invoked in the code is configurable by the user.

Injection string 230 provides another example of an injected string. In this example, a JavaScript code segment is enclosed in HTML tags to write a value to the parent HTML document. As shown, the value written by the write function includes an escape sequence that translates to an escaped character 232 (here the exclamation character). In some embodiments, this escaping can be performed in order to improve penetration of the exploit. To improve code penetration, certain special characters are escaped so that they pass superficial checks by the software system to sanitize input strings for invalid characters. For example, if the software system sanitizes a particular data field to remove instances of the exclamation character, the escape sequence 232 in injection string 230 will allow the injected string to avoid the sanitation. The escaped character may be corrected de-escaped by the software system later in the processing. Character escaping is language-dependent, and the injector 130 may use variations of character escapes for common programming languages to maximize the chances of code penetration. Commonly escaped characters include ', ", <, >, ?, %, &, \, and /. A common method of escaping is by using the \ prefix or ASCII encoding with % prefix. In some embodiments, the manner in which character escaping is performed in injection strings is configurable by the user.

Figure 3A:
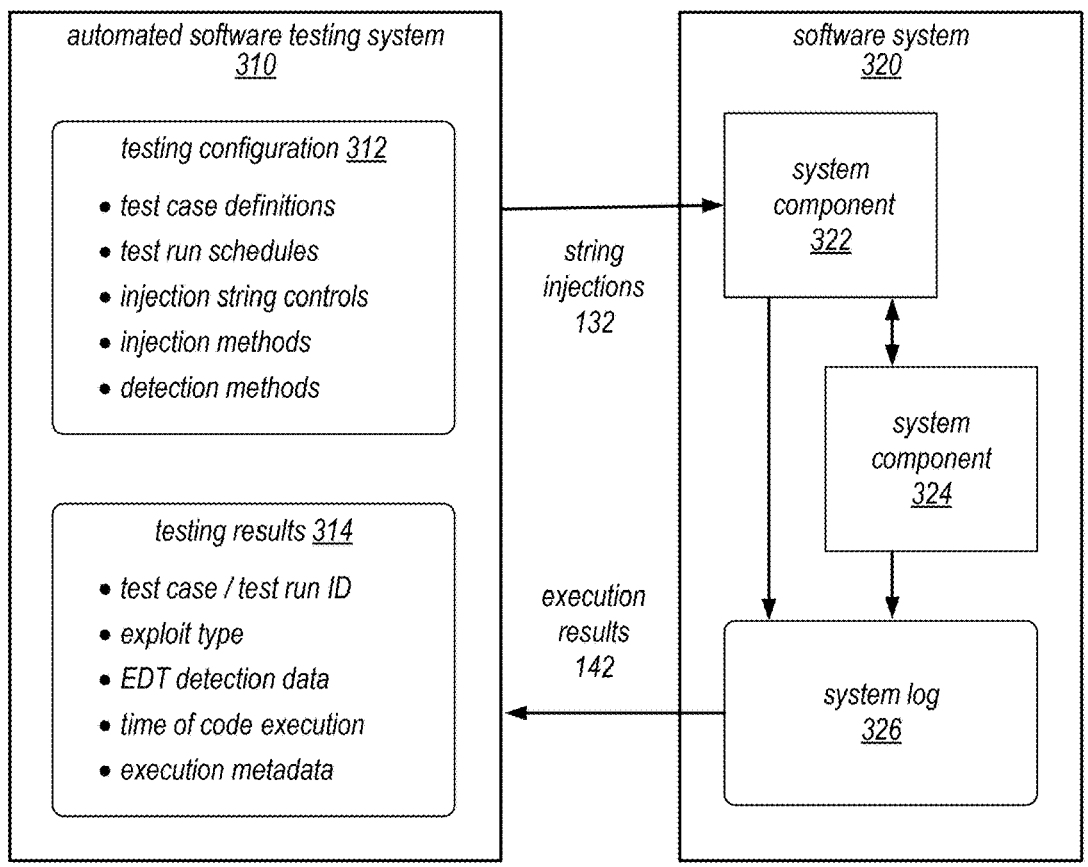
FIG. 3A illustrates use of the code injection vulnerability detection system as part of an automated software testing system, according to some embodiments.

FIG. 3A illustrates use of the code injection vulnerability detection system 110 as part of an automated software testing system 310, according to some embodiments.

As shown in this example, the software testing system 310 is configured to inject 132 test strings into the software system 320 and receive execution results 142 from the software system. The software testing system 310 may be configured to perform testing on software that is currently under development, or on a production software system that is running in a live production environment. The testing system 310 may perform tests on the software in an automated fashion, for example, regularly according to a set schedule or in response to specified events. In some embodiments, the string injection and vulnerability detection functionality of the testing system may be implemented as one of multiple testing tools integrated into the testing system.

As shown, in some embodiments, the functioning of the software testing system 310 may be controlled by test configuration data 312. Such configuration data may specify how testing is performed on the software 320. The configuration data may specify information such as test case definitions and test run schedules or conditions. Additionally, the configuration data may specify parameters that are specific to the string injection behavior of the system. These parameters may include injection string controls that specify how strings are to be generated. For example, injection string control parameters may specify a selection of programming languages to use for the executable code used in the injection strings, a selection of functions to execute by the executable code, a length of the string, a format of the string, or a set of characters to use in the string, among other things.

In some embodiments, the configuration data 312 may specify how injections are to be injected into the software and EDTs are to be detected from the software. As discussed, the string injections 132 and execution result collection 142 may be performed via multiple different avenues, which can be controlled by the user via testing configuration. For example, during development testing when the testing system has access to various internal components of the software, the configuration may specify particular internal APIs of specific system components 322 and 324 to use for the injection, and a particular internal log 326 of the system to use for collecting execution results. Internal system components that may be tested may include internal system work or message queues, databases, indexes, library modules, etc. In some embodiments, the testing may also use execution artifacts for injection or detection, including temporary files, runtime memory snapshots, host machine registries, etc.

As shown, in this example, the testing system 310 extracts certain testing results 314 from the execution results 142. The testing results may be specific to a particular test case or test run and include an identifier of the individual test run or test case. For a code injection test, the testing result may indicate the exploit type that was being targeted by a particular injection, and EDT detection metadata associated with the injection. The detection metadata may indicate whether the EDT was detected or not, and when and where the EDT was detected. In some embodiments, the testing results 314 may also include execution metadata about the actual execution that generated the EDT, which may be captured by the executable code embedded in the string. Such information may include the time when the code was executed, one or more environment variables of the execution environment that executed the code, a component identifier of the component that executed the unauthorized code, and/or call stack data (e.g. a call stack trace) associated with execution of the code.

Figure 3B:
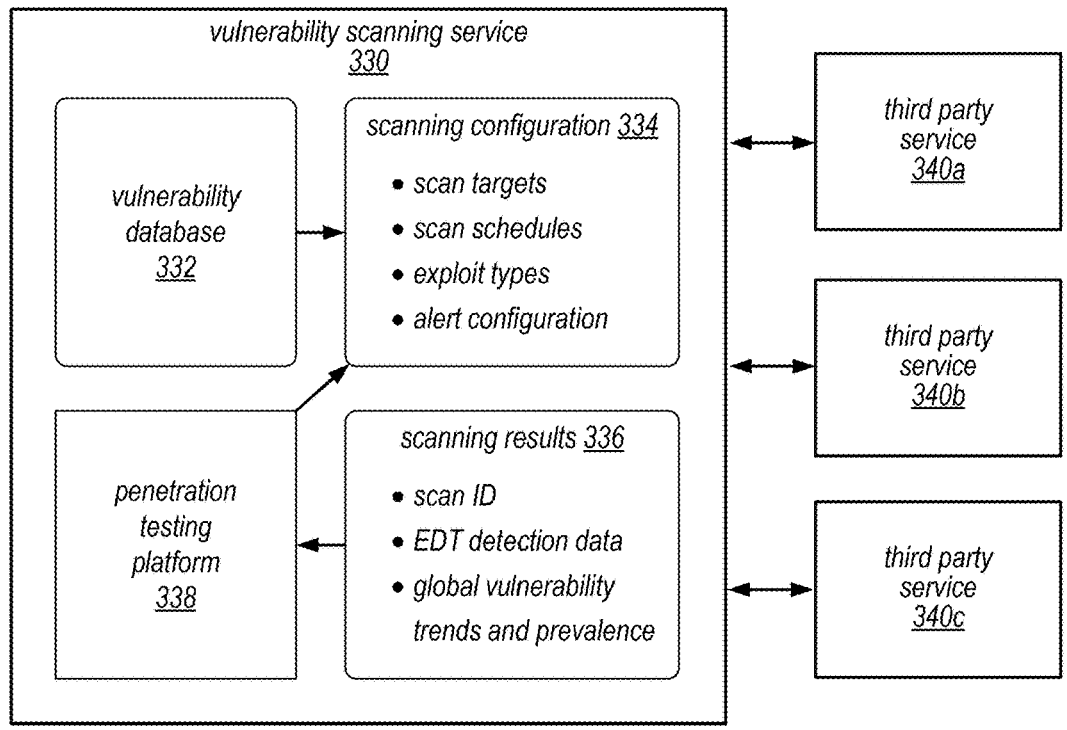
FIG. 3B illustrates use of the code injection vulnerability detection system as part of a vulnerability scanning service for scanning third party services, according to some embodiments.

FIG. 3B illustrates use of the code injection vulnerability detection system 110 as part of a vulnerability scanning service 330 for scanning third party services, according to some embodiments.

As shown in this example, a vulnerability scanning service 330 is configured to scan third-party services 340*a-c* for code injection vulnerabilities using the code injection vulnerability detection system 110 of FIG. 1. In some embodiments, the third-party services 340 may be web-based services or simple HTTP web servers that are publicly accessible via a public network such as the Internet. In some embodiments, the vulnerability scanning service 330 may be a private service that is configured to scan services with a private network. The scanning service 330 may be configured to monitor the services 340 for vulnerabilities by repeatedly performing vulnerability scans on the services.

As shown, in some embodiments, the scanning performed by the service 330 may be controlled by scanning configuration data 334. The configuration data may specify operational parameters of the scanning, such as scan targets, scan schedules, what types of exploits to include in a scan, and any alert configurations that control how alerts are generated if vulnerabilities are detected in a scan. For example, in some embodiments, a detected vulnerability may be reported in real time via a text or email message to a subscribing user, such as an administrator of a service 340. In some embodiments, the alert may be generated via a graphical user interface of an incident detection and response (IDR) service provider that is responsible for monitoring the third-party services 340.

In some embodiments, some of the scanning configuration 334 of the scanning service 330 may be derived from a vulnerability database 332. Such a database may contain a library of publicly known vulnerabilities of software systems, including code injection vulnerabilities. The scanning service 330 may be configured to scan for known vulnerabilities listed in the database 332. In some embodiments, the injection strings generated by the scanning service may be created according to generation rules specified in the vulnerability database. For example, the vulnerability database 332 may include information about the Log4Shell vulnerability, and specify rules to generate testing strings to target that vulnerability (e.g. using the logging library's particular syntax).

In some embodiments, the scanning service 330 may be implemented to include (or as part of) a penetration testing platform 338. Such a testing platform may allow software testers to perform customized penetration testing or threat hunting on the services 340. These users may specify scanning configurations 334 to perform ad hoc scanning of the services 340 to inject specific attack strings into the services and monitor the services for generated EDTs.

As shown, embodiments of the scanning service 330 are able to extract scanning results 336 from the execution of the services 340 after the attack strings are injected. The scanning results 336 may include a scan ID that ties a scan result to a particular scan. In some embodiments, the scan ID may be a reference ID that is generated along with or as part of the EDT. In some embodiments, the reference ID may be obtained by the operator of the third party service 340 (e.g. using a tool provided to the third party operator), and reference ID allows the operator to access scanning records maintained by the scanning service 330 and receive instructions regarding remediation steps to address the detected vulnerability. In some embodiments, the scanning results 326 may include demographic or statistical information that is aggregated from many third party services 340 monitored by the scanning service 330. Such information may indicate, for example, the types of vulnerabilities that are observed globally on the Internet, the prevalence of different types of vulnerabilities, and various time trends associated with different types of vulnerabilities.

Figure 4:
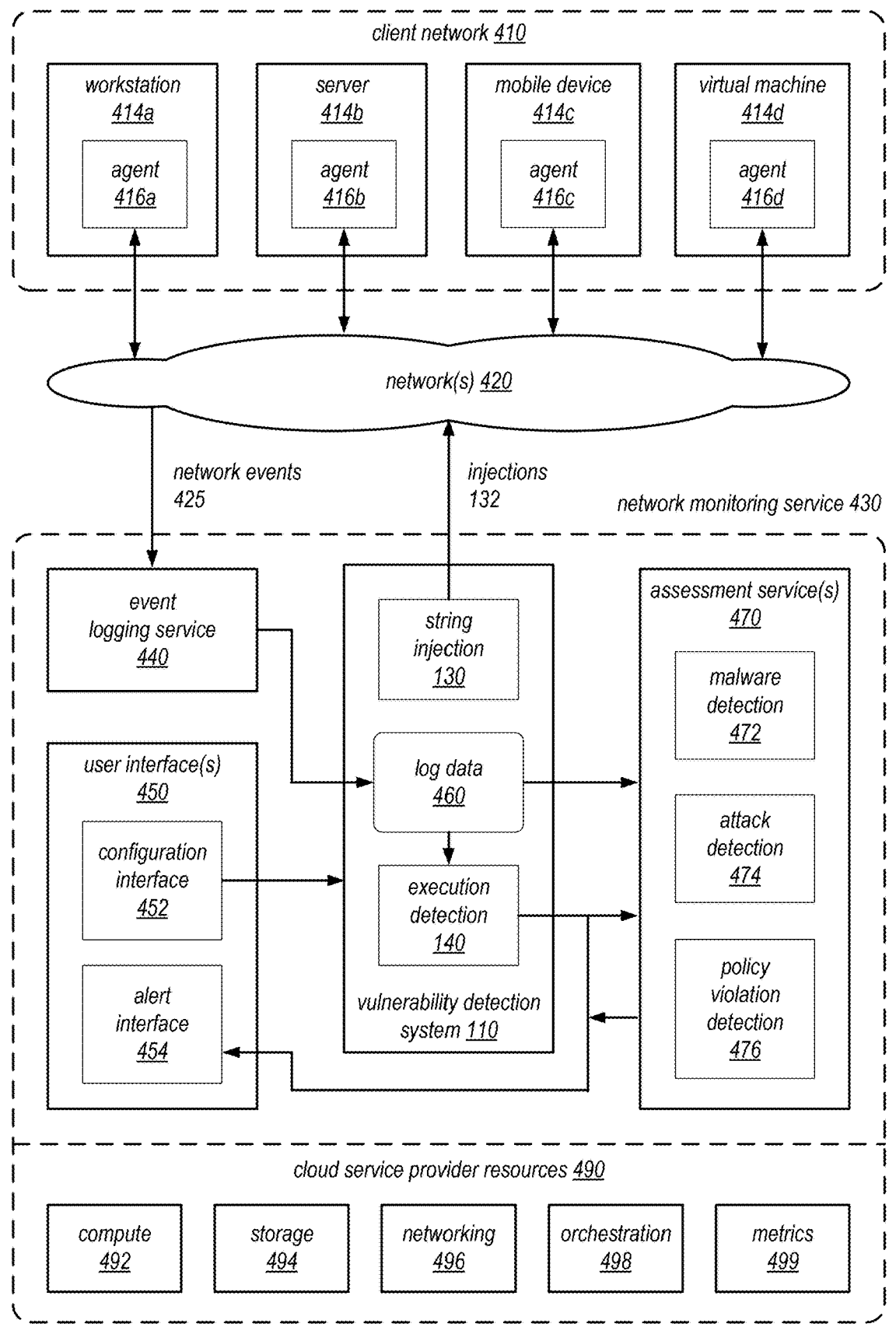
FIG. 4 illustrates an example implementation of the code injection vulnerability detection system that operates within a network monitoring service for monitoring client networks, according to some embodiments.

FIG. 4 illustrates an example implementation of the code injection vulnerability detection system that operates within a network monitoring service 430 for monitoring client network(s) 410, according to some embodiments.

As shown, an instance of the code injection vulnerability detection system 110 is implemented in a network monitoring service 430. In some embodiments, the network monitoring service 430 may be a service implemented in the cloud and on a service provider network, such as a platformas-a-service (PaaS) network, an infrastructure-as-a-service provider (IaaS) network, or a software-as-a-service (SaaS) network. The network monitoring service 430 may be configured to communicate with many agents 416*a-d* deployed on machines 414*a-d* in a client network 410. The agents 414 may communicate with the network monitoring service 430 over one or more intermediary networks 420. In some embodiments, the agents may be configured to collect or compile network activity data or events 425, and transmit the data to the network monitoring service 430. The network monitoring service 430 may receive network activity data from many different client networks operated by different entities, companies, organizations, groups, etc., and perform remote monitoring of the networks of these different clients. The network monitoring service 430 may analyze the network events 425 to monitor the client network 410 for security incidents or security posture problems.

In some embodiments, the collected network events 425 may include the execution results 142 of software in the client network 410 and may include or indicate EDTs 124 generated during executions of the software. Depending on the embodiment, the agents 416 may be controllable by the network monitoring service 430 to perform string injections 132, collect execution results 142, detect software vulnerabilities, or a combination of these tasks.

As shown, the client network 410 in this example includes different types of computing resources, such as a workstation 414*a*, a server 414*b*, a mobile device 414*c*, and a virtual machine 414*d*. The virtual machine 414*d* may be an instance of a computer and operating system that is emulated and hosted on a physical virtual machine host. The virtual machine host may implement virtualization hardware and/or software (e.g. a hypervisor) to execute and manage multiple instances of guest operating systems. Example implementations of such virtualization technologies include VMWARE ESX/ESXI, MICROSOFT HYPERV, ORACLE VIRTUALBOX, QEMU, and Kernel-based Virtual Machine (KVM). Another type of virtualized execution environment may be a hosted container, which provides a portable and isolated execution environment over a host operating system of a physical host. Examples of container hosting technologies include DOCKER and GOOGLE KUBERNETES. In some embodiments, the virtual machine 414*d* may be hosted in a platform service provider network, such as the platform service provider network that is hosting the network monitoring service 430. Depending on the embodiment, the agents 416 may be deployed on other types of computing systems, including embedded systems, networking devices, storage devices, Internet-of-Things (IoT) devices, vehicles, and the like.

In various embodiments, the network 420 may encompass any suitable combination of networking hardware and protocols necessary to enable communications between the agents 416 and the network monitoring service 430. In some embodiments, the remote machines 414 may execute in a private network of a company, behind a company firewall, and the network 420 may include a public network such as the Internet, which lies outside the firewall. The network 420 may encompass the different telecommunications networks and service providers that collectively implement the Internet. In some embodiments, the network 420 may also include private networks such as private local area networks (LANs), private wide area networks (WANs), or private wireless networks. The network 420 may be implemented using different hardware (e.g., modems, routers, switches, load balancers, proxy servers, etc.) and software (e.g., protocol stacks, routing software, firewall/security software, etc.) for establishing networking links between the remote machines 414 and the network monitoring service 430. In some embodiments, the agents 416 may transmit the network events 425 to the network monitoring service 430 over secure communication channels such as transport layer security (TLS) connections implemented over the network 420.

As shown in this example, the network monitoring service 430 is implemented using a number of supporting services 440, 450, and 470 implemented by the service provider network. Clients of the network monitoring service 430 may convey service requests to and receive responses from these services via their respective service interfaces. In some embodiments, the service request and responses may be defined as part of a RESTful API (e.g. one or more web services). The requests and responses may be formatted as JSON documents. In some embodiments, the network monitoring service 430 may implement service interfaces using other types of remote procedure calling protocols, such as GOOGLE PROTOCOL BUFFERS. The platform service provider network may provide the hardware and/or software needed to implement service endpoints for these services, and the request routing facilities to ensure that a request is properly routed to the appropriate endpoints.

As shown, the service provider network may provide different types of service provider resources 490, which can be leased by customers to implement hosted services. As shown, the platform service provider may provide resource services such as compute resource service 492, storage resource service 494, networking resources service 496, orchestration service 498, and resource metrics service 499. The services of the network monitoring service 430 may be built using these underlying resource services provided by the platform service provider. In some embodiments, the platform service provider resources 490 may implement features such as load balancing of service requests and/or dynamic management and scaling of service node pools. In some embodiments, each of the services 440, 450, and 470 may be implemented using a pool of service nodes provided by the platform service provider, which may be individual instances of virtual machines. In some embodiments, the platform service provider may be a provider such as AMAZON WEB SERVICES or MICROSOFT AZURE.

In some embodiments, the network monitoring service 430 may be configured to monitor, analyze, and take action on security-related incidents that are detected in the remote client networks 410. In some embodiments, the network monitoring service 430 may implement an event logging service 430 that receives network events 425 from the remote client network and stores the received data as event logs data 460. The event logging service 440 may implement service functionality to allow users or other software components to query the event logs 460. As shown in this example, the log data 460 may be analyzed by the execution detection component 140 to monitor for the presence of EDTs 124. The vulnerability detection system 110 may execute continuously on incoming log data 460 to watch for any EDTs 124 produced by strings injected by the injector component 130 and report any detected code injection vulnerabilities to downstream assessment services 470 and/or an alert interface 454 implemented as part of a user interface 450.

As shown, in some embodiments, the assessment service(s) 470 may implement a variety of monitoring processes to generate alerts in response to detected security problems in the client network 410. These alerts may be forwarded to the alert interface 454, which will allow human security analysts to perform a more in-depth examination of the underlying security problems. For example, in some embodiments, a malware detection module 472 may examine collected machine event logs to detect installation of a particular type of malware executable. As another example, an attack detection module 474 may examine the email event logs to detect phishing attacks using new or unusual email addresses, web addresses, or email content. As yet another example, a policy violation detection module 476 may examine the configuration changes in the client network 410 to detect violations of security policies. In some embodiments, the alerts generated by the assessment service(s) 470 may trigger automated mitigation or remediation actions to be performed on the client network 410 to address detected threats in the client network, for example, to gather additional data about the threats from the client network, or quarantine or isolate components of the client network from sensitive data or other components.

As shown, in some embodiments, the network monitoring service 430 may implement one or more user interface(s) 450, which may be implemented as GUIs or web interfaces viewable using a web browser. In some embodiments, these user interfaces 450 may be implemented by client-side applications. As shown, the user interfaces may include the alert interface 454 to notify users of detected alerts. In some embodiments, the alert interface 454 may be accessible from both the client network 410 and a central monitoring location where security analysts are monitoring the client network.

In some embodiments, the user interface(s) 450 may also implement a configuration interface 452. The configuration interface 452 may be used to configure various aspects of the network monitoring system 230, including the vulnerability detection system 110. For example, the configuration interface 452 may be used to specify the testing configurations 312 or scanning configurations 324, as discussed in connection with FIGS. 3A and 3B.

Figure 5:
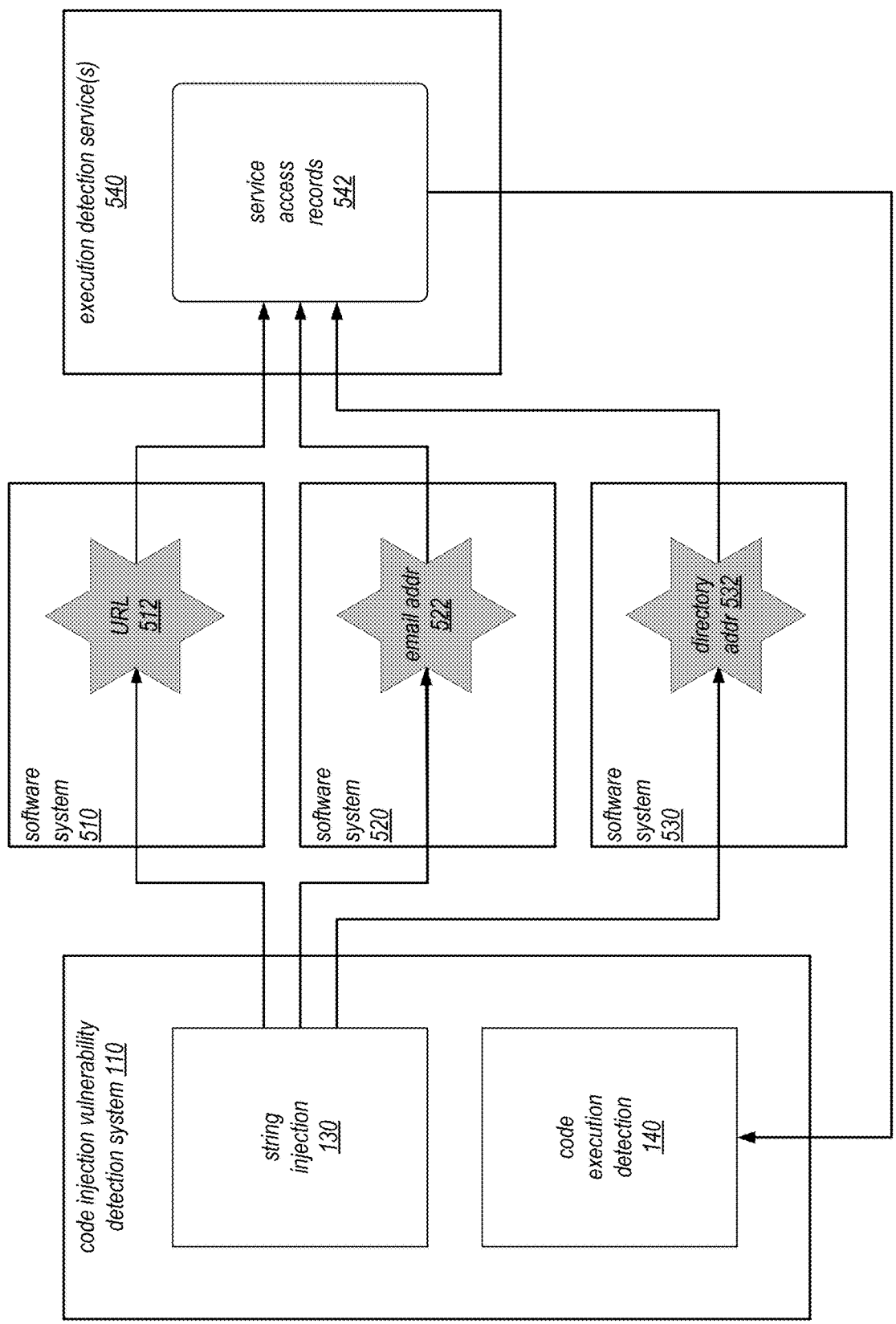
FIG. 5 illustrates operations of the code injection vulnerability detection system where generated EDTs cause software systems to access an execution detection service, according to some embodiments.

FIG. 5 illustrates operations of the code injection vulnerability detection system where generated EDTs cause software systems to access an execution detection service, according to some embodiments.

As shown, in some embodiments, the injection strings generated by the string injector 130 produce unique addresses or access tokens directed to an external execution detection service 540, and cause the software systems 510, 520, and 530 to perform an access of the execution detection service 540. For example, the generated EDT may be a specific URL 512 that refers to a monitored resource. The URL may refer to an image located at http://example.com/unique_id.jpeg. The URL may be generated with embedded code that will only recreate the URL if an exploit is successfully executed by the software system 510. Thus, if the software system later accesses the monitored resource at the execution detection service 540 associated with the URL, a vulnerability to the exploit has been demonstrated. As shown, in some embodiments, the execution detection service 540 may track service access records 542 from many software systems 510, 520, and 530, and provide the records to the code execution detection component 140 for further analysis and/or reporting.

Depending on the embodiment, different types of EDTs can be used to produce observable side effects from the software. For example, instead of a URL 512, the generated EDT may be another type of address such as an IP address, an email address 522, or a directory address 532. For example, a software system that has the Log4Shell vulnerability will successfully interpret the string "${jndi:ldap://example.com/uniqu${e3z1:-e}_id}" to cause an access a resource associated with the directory address.

Figure 6:
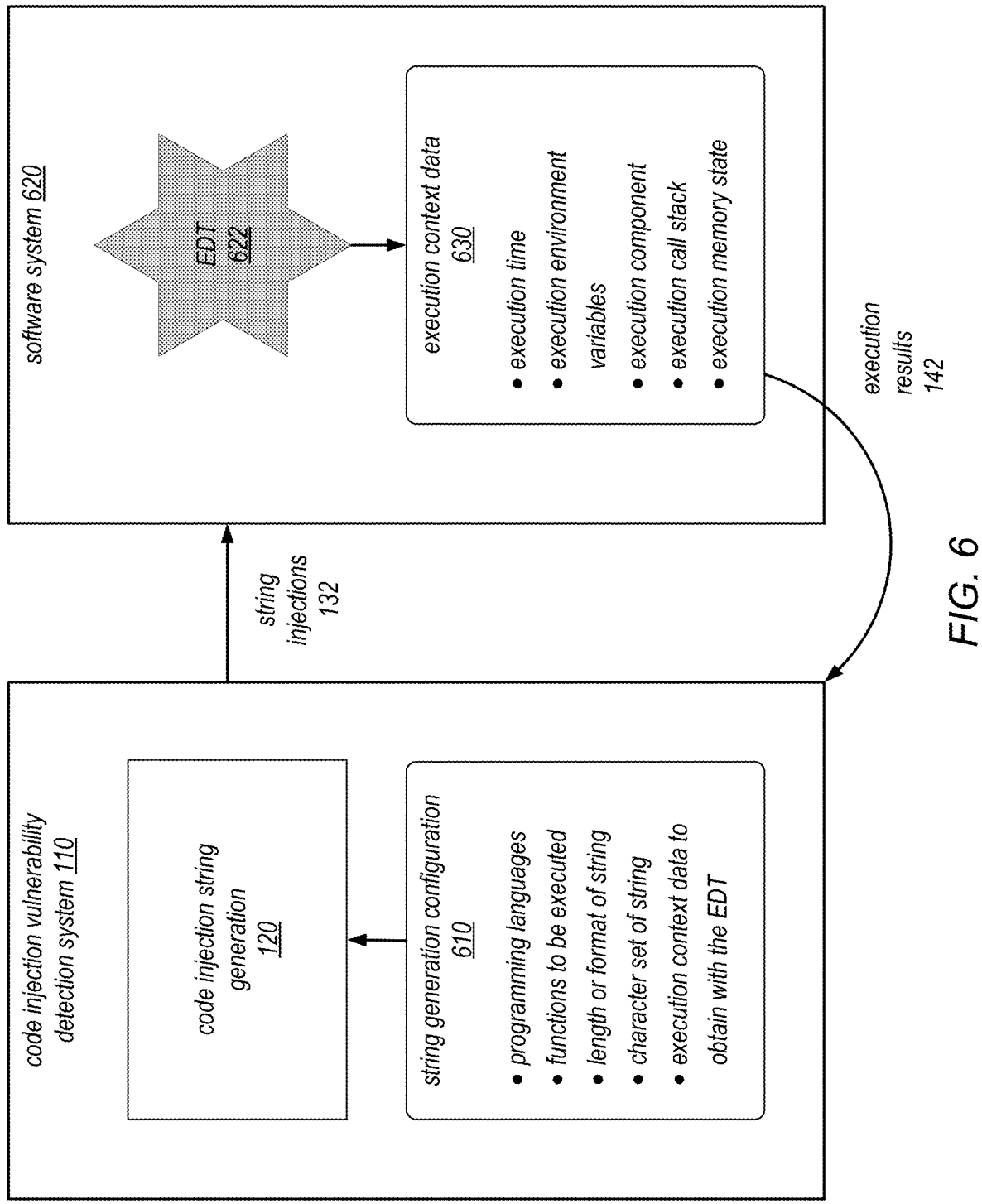
FIG. 6 illustrates configuration parameters and execution data collection capabilities of the code injection vulnerability detection system, according to some embodiments.

FIG. 6 illustrates configuration parameters and execution data collection capabilities of the code injection vulnerability detection system, according to some embodiments.

As discussed, in some embodiments, the injection string generator 120 may generate injection strings randomly. However, this random generation may be tuned, constrained, or controlled by string generation configurations 610. This configuration may be specified as part of testing configuration data 312, scanning configuration data 334, or rules stored in a vulnerability database 332, as discussed previously. As shown, depending on the type of exploit, the string generation configuration data 610 may limit the random string generation to a selection of programming languages to use for the executable code, a selection of functions to be invoked by the code (preferably "pure" functions that produce deterministic output given the same input and with no side effects), a specific length or format of the injection string, and/or a specific set of characters of the injection string (or special characters to be escaped).

In some embodiments, the string generation configuration data 610 may also specify additional execution context data 630 that are to be obtained along with the EDT. Such execution context data may be collected by including additional executable code as part of the exploit. Depending on the embodiment, the execution context data 630 may be collected via the same injection string that generates the EDT or a sequence of multiple injection strings sent as part of a progressive probing of the software. The execution context data 630 may be encoded as part of the EDT, or stored as a separate data structure that can be accessed separately (e.g. in an execution log that can be accessed to retrieve the execution results 142). As shown, example types of execution context data 630 that may be collected by string injections 132 include the execution time of the executable code, various execution environment variables (e.g. the launching parameters of a Java virtual machine), the identity of the execution component that executed the code (e.g. the provider and version of a library component), the execution call stack, and/or other aspects of the execution memory state at the time of execution. In some embodiments, the collected execution context data 630 may be reported along with the detected vulnerability in the detection alert or vulnerability report.

Figure 7:
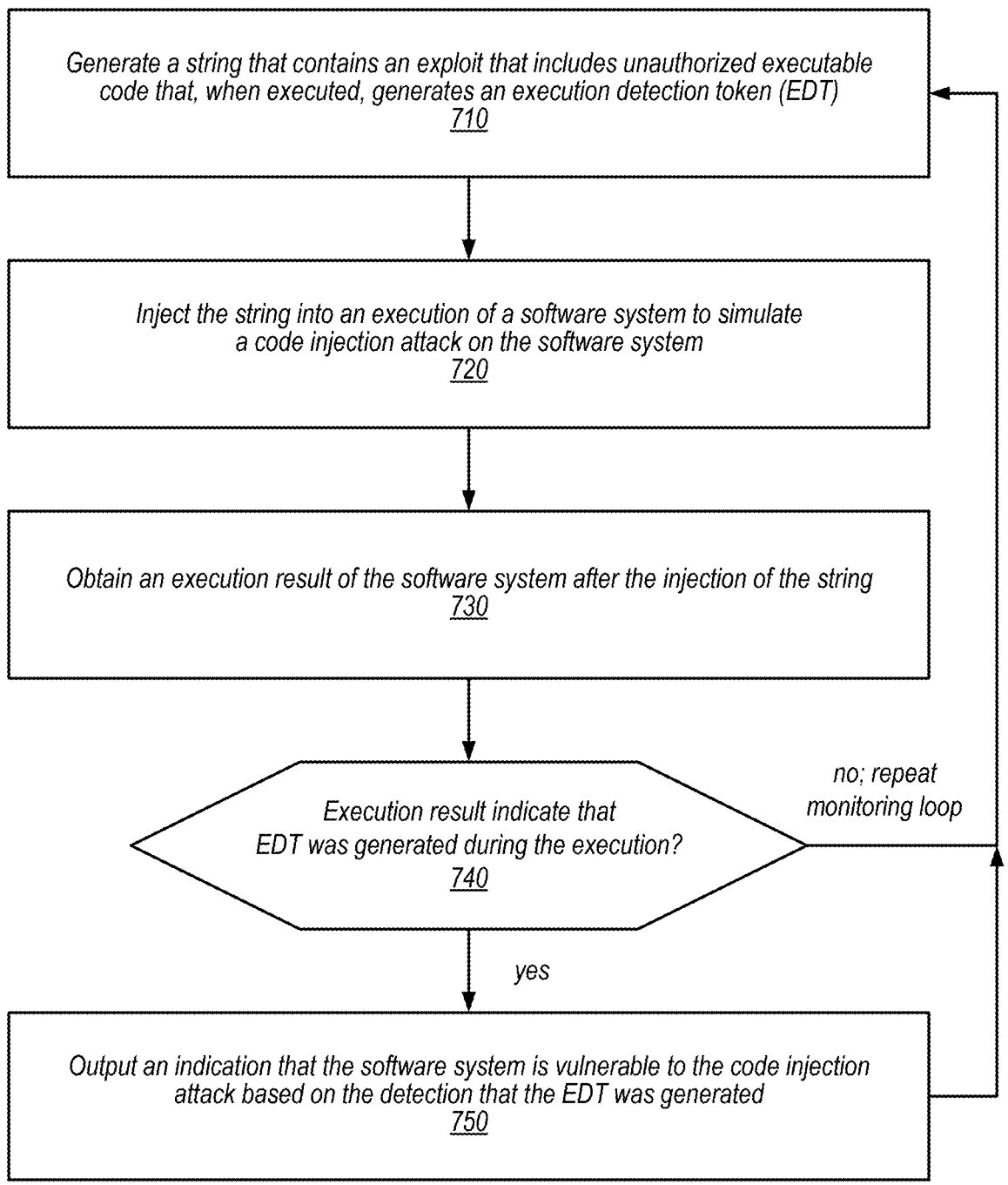
FIG. 7 is a flowchart that describes an example process performed by the code injection vulnerability detection system to detect code injection vulnerabilities, according to some embodiments.

FIG. 7 is a flowchart that describes an example process performed by the code injection vulnerability detection system 110 to detect code injection vulnerabilities, according to some embodiments.

The process begins at operation 710, where the injection string 122 is generated. The injection string contains an exploit that includes an unauthorized executable code that, when executed, generates an execution detection token or EDT 124. The unauthorized code is used to simulate a code injection attack on a software system. In some embodiments, the executable code is a code that exploits a vulnerability of the software system, and cannot be executed without the vulnerability. The software system may be a variety of software including software under development or production software running in production environments, including publicly accessible services on the Internet. The generation of the string may be performed repeatedly and randomly as a part of a monitoring process, and may be controlled by string generation configuration specifications on rules. In some embodiments, the injection strings are generated according to a type of exploit being targeted, and the generation rules may be specified as part of a vulnerability database.

At operation 720, the string is injected into an execution of the software system to simulate a code injection attack on the software system. The injection may occur via many different facts of the software system, including an API of the software system (including public request API or internal component APIs), a database of the software system, a configuration file or repository of the software system, a library component used by the software system, or another software system that provides data to the software system. The injection may be recorded in a data store along with the expected EDT that will be produced by the injected string, so that the EDT can be used to scan execution results of the software system during the detection phase.

At operation 730, the system obtains an execution result of the software system after the injection of the string. The execution result of the software system may be obtained from different avenues, including an API response of the software system, a log of the software system, a database of the software system, a volatile memory of the software system, or another software system that receives data from the software system. As discussed in connection with FIG. 5, in some embodiments, the execution result may be a side effect produced by the injection string, for example, an attempt by the software system to access an external service using a particular service address generated as a result of the injected exploit.

At operation 740, the system determines whether the execution result indicates that the EDT was generated during the execution of the software system. For example, the execution results may be scanned or monitored for the generated EDT. As another example, the fact that the EDT was generated may be detected based on an outbound access of the software system. A determination that the EDT was generated proves that the exploit was successfully executed within the software system. The EDT may be sufficiently unique so that detections have no risk of false positives. In some embodiments, the system may affirmatively determine from the execution results that the EDT was not generated by the software system. If the EDT is not generated, the process may loop back to repeat the monitoring process.

If the EDT was generated, the process proceeds to operation 750, where an indication is output that the software is vulnerable to the type of exploit or code injection attack that was performed. In some embodiments, the indication may be output as an alert, which may be broadcast to subscribing users or displayed on a graphical user interface (e.g. the GUI of an incident detection and response (IDR) center). In some embodiments, the indication may be added to a vulnerability report of the software system, which may be provided to software testers or owner/operators of the software system that have subscribed to a vulnerability scanning service. In some embodiments, detection of the vulnerability may trigger certain automated events on the software system, such as rejection of a change to the software system, performance of more targeted testing on the software system, or isolating or quarantining the software system from other production environment systems.

Figure 8:
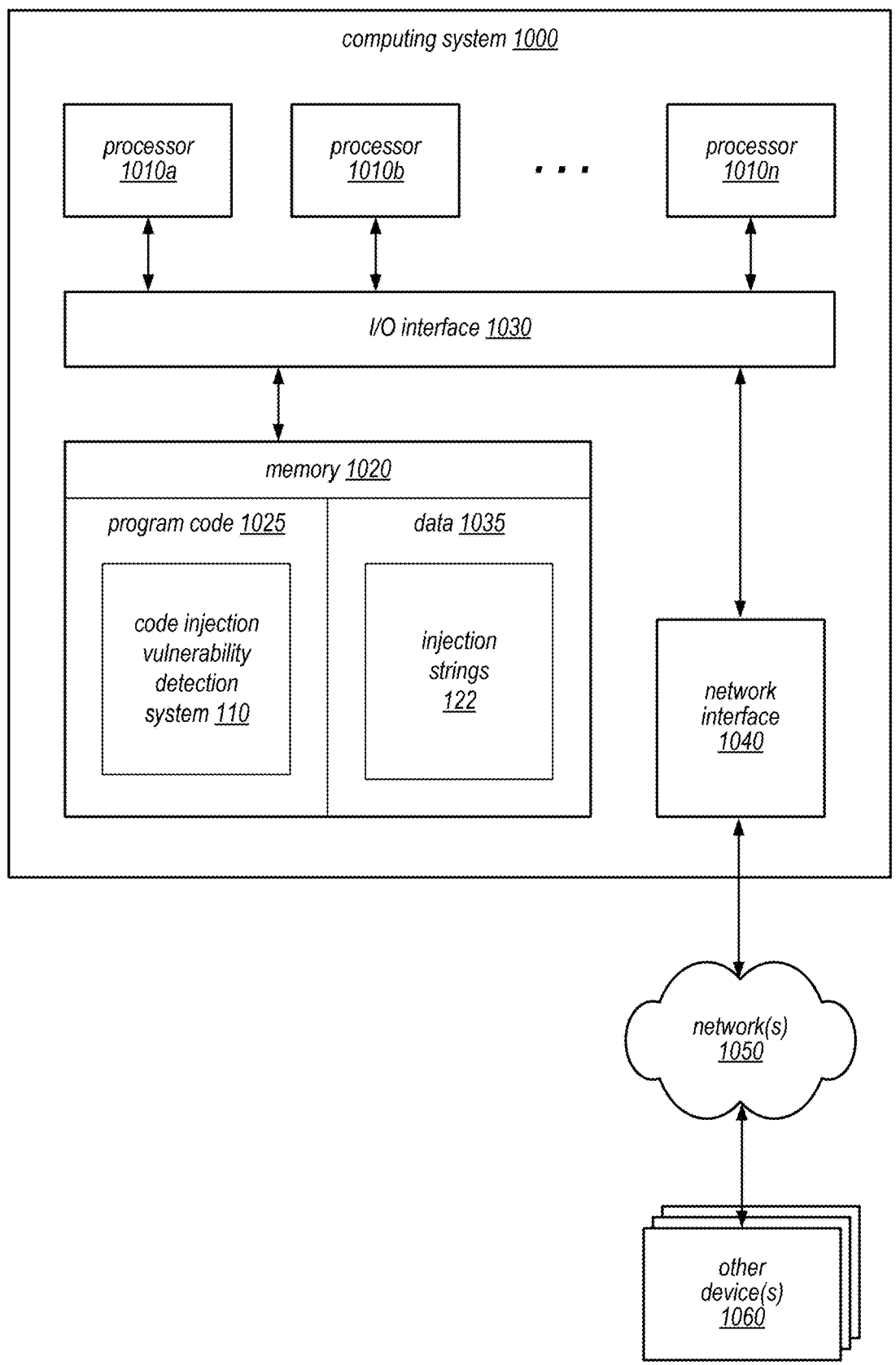
FIG. 8 is a block diagram illustrating an example computer system that can be used to implement one or more portions of the code injection vulnerability detection system, according to some embodiments.

FIG. 8 is a block diagram illustrating an example computer system that can be used to implement one or more portions of the code injection vulnerability detection system, according to some embodiments. For example, the computer system 1000 may be a server that implements one or more components of the code injection vulnerability detection system 110 of FIG. 1. In some embodiments, the computer system 1000 may be used to implement one or more components of the network monitoring service 430 of FIG. 4.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the code injection vulnerability detection system 110, as discussed. The system memory 1020 may also be used to store data 1026 needed or produced by the executable instructions. For example, the in-memory data 1026 may be used to store the injection strings 122, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:
one or more computing devices configured to implement a software testing system, configured to:
generate a string that contains an exploit, wherein the exploit includes executable code that, if executed by a software system, causes an execution detection token (EDT) to be generated, wherein the EDT contains a unique value that indicates vulnerability of the software application to the exploit with no risk of false positives;
store the EDT in a data store of the software testing system as part of an injection record;
inject the string into an execution of the software system to simulate a code injection attack on the software system;
obtain an execution result of the software system after the injection of the string;
match the execution result to the injection record in the data store to detect that the EDT was generated during the execution; and
output an indication that the software system is vulnerable to the exploit based on the detection that the EDT was generated.

2. The system of claim 1, wherein the software testing system is configured to:
inject another string that contains the exploit into an execution of another version of the software system;
obtain another execution result of the other version of the software system after the injection of the other string;
determine, based on the other execution result, that the other version of the software system is not vulnerable to the exploit; and
output an indication that the other version of the software system is not vulnerable to the exploit.

3. The system of claim 1, wherein the executable code is demarcated within the string by a prefix or suffix.

4. The system of claim 1, wherein the software testing system is configured to:
generate strings randomly and inject the strings into executions of the software system as part of an automated testing of the software system, wherein the randomization constrained by user specification that specifies one or more of:
a selection of programming languages to use for the executable code,
a selection of functions to execute by the executable code,
a length of the string,
a format of the string, or
a set of characters to use in the string.

5. The system of claim 1, wherein the software testing system is configured to perform testing on the software system during development of the software system.

6. The system of claim 1, wherein the software testing system is configured to perform testing on a production version of the software system.

7. The system of claim 1, wherein:
the software system sanitizes input data by removing one or more of a set of special characters from the input data; and
the software testing system is configured to escape the one or more special characters in the injected string so that the one or more special characters are not removed by the software system.

8. The system of claim 1, wherein to inject the string into the software system, the software testing system is configured to:
submit the string via a request interface of the software system;
submit the string via an internal interface implemented by an internal component of the software system;
add the string to a database of the software system;

add the string to a configuration file of the software system;

add the string to a library component loaded by the software system; or inject the string into another software system that provides data to the software system.

9. The system of claim 1, wherein to detect that the EDT was generated, the software testing system is configured to detect the EDT:

in a response generated by the software system,
in a log of the software system,
in a database of the software system,
in a volatile memory image of the software system, or
in data of another software system that receives data from the software system.

10. The system of claim 1, wherein:

the EDT includes a service address of a network service; and to detect that the EDT was generated, the software testing system is configured to detect an access of the network service via the service address.

11. The system of claim 1, wherein:

the software system is implemented at web server; and
the string is injected via a Hypertext Transfer Protocol (HTTP) request to the web server; and
the EDT is detected in a log of the web server.

12. The system of claim 1, wherein the executable code includes one or more of Java code, JavaScript code, Hypertext Preprocessor (PHP) code, or Structured Query Language (SQL) code.

13. The system of claim 1, wherein the executable code executes a pure function on at least a portion of the string.

14. The system of claim 1, wherein the executable code performs a transformation on at least a portion of the string.

15. The system of claim 1, wherein execution of the executable code causes additional testing data to be generated along with the EDT, including one or more of:

a time when the executable code was executed,
one or more variables of an execution environment that executed the executable code, or
a component identifier of a component of the software system that executed the executable code.

16. The system of claim 1, wherein the software testing system is configured to generate different types of injection strings to test for different types of exploits stored in a library, and the different types of strings are generated according to generation rules stored in the library.

17. A method, comprising:

performing, by a software testing system implemented by one or more computing devices:

generating a string that contains an exploit, wherein the exploit includes executable code that, if executed by a software system, causes an execution detection token (EDT) to be generated, wherein the EDT contains a unique value that indicates vulnerability of the software application to the exploit with no risk of false positives;

storing the EDT in a data store of the software testing system as part of an injection record;

injecting the string into an execution of the software system to simulate a code injection attack on the software system;

obtaining an execution result of the software system after the injection of the string;

matching the execution result to the injection record in the data store to detect that the EDT was generated during the execution; and outputting an indication that the software system is vulnerable to the exploit based on the detection that the EDT was generated.

18. The method of claim 17, wherein the method is performed as part of development testing on the software system during development of the software system.

19. The method of claim 17, wherein the method is performed production testing on a production version of the software system.

20. The method of claim 17, wherein detecting that the EDT was generated comprises detecting the EDT:

in a response generated by the software system,
in a log of the software system,
in a database of the software system,
in a volatile memory image of the software system, or
in data of another software system that receives data from the software system.

* * * * *